(12) United States Patent
Bolz et al.

(10) Patent No.: US 7,003,385 B2
(45) Date of Patent: Feb. 21, 2006

(54) VEHICLE-SENSITIVE ACTUATION OF A SEATBELT RETRACTOR

(75) Inventors: Michael Bolz, Welzheim (DE); Uwe Class, Schechingen (DE); Arnold Herberg, Davisburg, MI (US)

(73) Assignee: TRW Automotive GmbH, Alfdorf (DE)

( * ) Notice: Subject to any disclaimer, the term of this patent is extended or adjusted under 35 U.S.C. 154(b) by 7 days.

(21) Appl. No.: 10/979,720

(22) Filed: Nov. 2, 2004

(65) Prior Publication Data
US 2005/0107932 A1    May 19, 2005

(30) Foreign Application Priority Data
Nov. 4, 2003    (DE) ................. 103 51 403

(51) Int. Cl.
*G06F 7/00*    (2006.01)
(52) U.S. Cl. .......................... 701/45; 280/807
(58) Field of Classification Search ............. 701/29, 701/34, 36, 45; 280/801.1, 801.2, 807
See application file for complete search history.

(56) References Cited

U.S. PATENT DOCUMENTS

| | | | |
|---|---|---|---|
| 5,490,575 A | 2/1996 | Suran et al. | |
| 5,637,798 A | 6/1997 | Schatz | |
| 6,198,997 B1 | 3/2001 | Ishikawa et al. | |
| 6,447,012 B1 | 9/2002 | Peter et al. | |
| 6,485,057 B1 * | 11/2002 | Midorikawa et al. | ....... 280/807 |
| 6,616,186 B1 | 9/2003 | Midorikawa et al. | |
| 6,738,697 B1 * | 5/2004 | Breed | .......................... 701/29 |
| 6,755,369 B1 | 6/2004 | Holbein | |

FOREIGN PATENT DOCUMENTS

| | | |
|---|---|---|
| DE | 3705846 | 9/1987 |
| DE | 3828072 | 11/1989 |
| DE | 4439203 | 5/1996 |
| DE | 19844149 | 4/1999 |
| DE | 10044426 | 4/2001 |
| DE | 19957814 | 6/2001 |
| DE | 20113779 | 2/2002 |
| DE | 69527800 | 4/2003 |

* cited by examiner

*Primary Examiner*—Richard M. Camby
(74) *Attorney, Agent, or Firm*—Tarolli, Sundheim, Covell & Tummino L.L.P.

(57)    ABSTRACT

A method for vehicle-sensitive actuation of a locking mechanism for a seatbelt retractor in a vehicle by means of a actuation signal that is generated by a control unit equipped with a microcontroller. Measured signals are transmitted to the control unit from several sensors that detect the vehicle situation. The actuation signal is suppressed when a suppression algorithm in the control unit determines that the seatbelt is not in use, that the vehicle is standing still, that the vehicle speed is not above a certain limit value, or that only the vehicle acceleration measured in the vertical direction exceeds a certain triggering limit value.

5 Claims, 5 Drawing Sheets

VEHICLE-SENSITIVE ACTUATION OF A SEATBELT RETRACTOR

Figure 1:
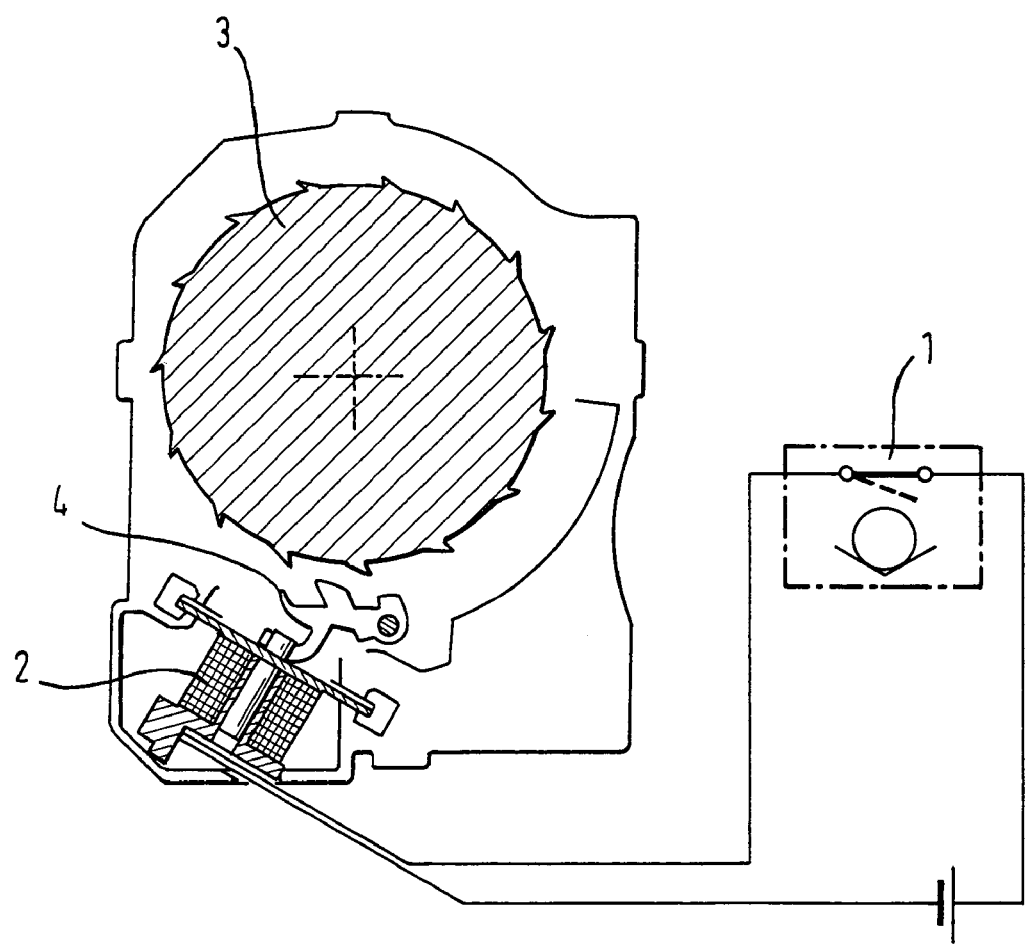

The present invention relates to a method for vehicle-sensitive actuation of a locking mechanism for a seatbelt retractor in a vehicle by means of an actuation signal that is generated by a control unit equipped with a microcontroller.

In seatbelt retractors, the locking mechanism has to be activated according to predefined triggering criteria that are laid down by the automobile manufacturer or by government regulations. Vehicle-sensitive triggering criteria are, for example, the exceeding of a certain vehicle deceleration or of a certain angle of inclination of the vehicle. In modern vehicles, the vehicle situation is detected by a central sensor or by several sensors distributed throughout the vehicle, the measured signals of which are transmitted via a bus to the control unit of the seatbelt retractor. The triggering criterion for the locking mechanism is specified by the control unit through its evaluation of the measured signals. The sensors arranged in the vehicle include—in addition to inertia sensors—particularly the sensors of the ABS system which are also used for slip control, or switches on the belt buckles and rotational angle indicators on the belt retractors.

Each locking procedure involves the movement of a mechanical part, especially a triggering pawl, that engages in the external teeth of a control disk of the seatbelt retractor. Fundamentally, any movement of a mechanical component causes wear. The latching of a triggering pawl is associated with an activation noise that is sometimes perceived to be annoying, especially in belt retractors that are integrated into the seat and are thus situated near the head of the vehicle occupant.

The invention provides a method for vehicle-sensitive actuation of a locking mechanism in a seatbelt retractor by means of which the occurrence of activation of the locking mechanism is considerably reduced. According to a first embodiment of the invention, in which it is assumed that the vehicle situation is detected by a plurality of sensors distributed in the vehicle, the triggering criterion for the locking mechanism is specified by an evaluation of the measured signals. The actuation signal, however, is suppressed if the triggering criterion is fulfilled but the measured signals indicate one of the following conditions:
  the seatbelt is not in use;
  the vehicle is standing still;
  the vehicle speed is not above a predetermined limit value,
  only the vehicle acceleration measured in the vertical direction exceeds a predetermined triggering limit value.

In all of these cases, the activation of the locking mechanism is effectively not necessary and is thus suppressed. This leads to the envisaged preservation of the mechanical components of the locking mechanism and to the avoidance of unnecessary activation noises.

In the preferred embodiment of this first inventive approach, the vehicle acceleration values are detected along three orthogonal axes by means of a central sensor unit and the corresponding measured values are distributed via a bus to the seatbelt retractors installed in the vehicle. This measure—while avoiding a duplication of the sensors—results in a good correlation of the functions of all of the seatbelt retractors installed in the vehicle.

According to a second approach of the invention, in which it is assumed that the vehicle deceleration and the angle of inclination of the vehicle are detected by a central inertia sensor and that there are additional sensors in the vehicle for detecting the vehicle condition, the triggering signal is transmitted from the central inertia sensor via a bus of the control unit of the seatbelt retractor if a predefined acceleration value or angle of inclination of the vehicle is exceeded. The control unit also receives the measured signals from other sensors via the bus and combines the triggering signal with the measured signals in such a way that the actuation signal is suppressed if the triggering criterion is fulfilled but the measured signals indicate one of the following states:
  the seatbelt is not in use;
  the vehicle is standing still;
  the vehicle speed is not above a predetermined limit value,
  only the vehicle acceleration measured in the vertical direction exceeds a predetermined triggering limit value.

In all of these cases, the activation of the locking mechanism is effectively not necessary and is thus suppressed. This leads to the envisaged preservation of the mechanical components of the locking mechanism and to the avoidance of unnecessary activation noises.

It is especially advantageous to use a capacitive acceleration sensor that detects dynamic as well as static acceleration of the vehicle in at least two directions that are at a right angle with respect to each other and that emits a pulse-duration modulated signal for each axis. On the basis of these signals, even a low-performance microcontroller can determine the acceleration values and the angle of inclination of the vehicle in the three axes of the spatial coordinate system.

The methods according to the invention are especially well-suited for use with seatbelt retractors the locking mechanism of which has a restrictedly rotatable control disk with external teeth that is situated on the retractor shaft, the locking mechanism having a triggering pawl that interacts with the control disk, that is either spring-loaded in engagement with the external teeth of the control disk or that is held by an electromagnet so as to be disengaged from the external teeth of the control disk during the excitation of the electromagnet. With such a locking mechanism, the activation noise that is made every time the electromagnet is switched on and off can have an annoying effect.

Figure 2:
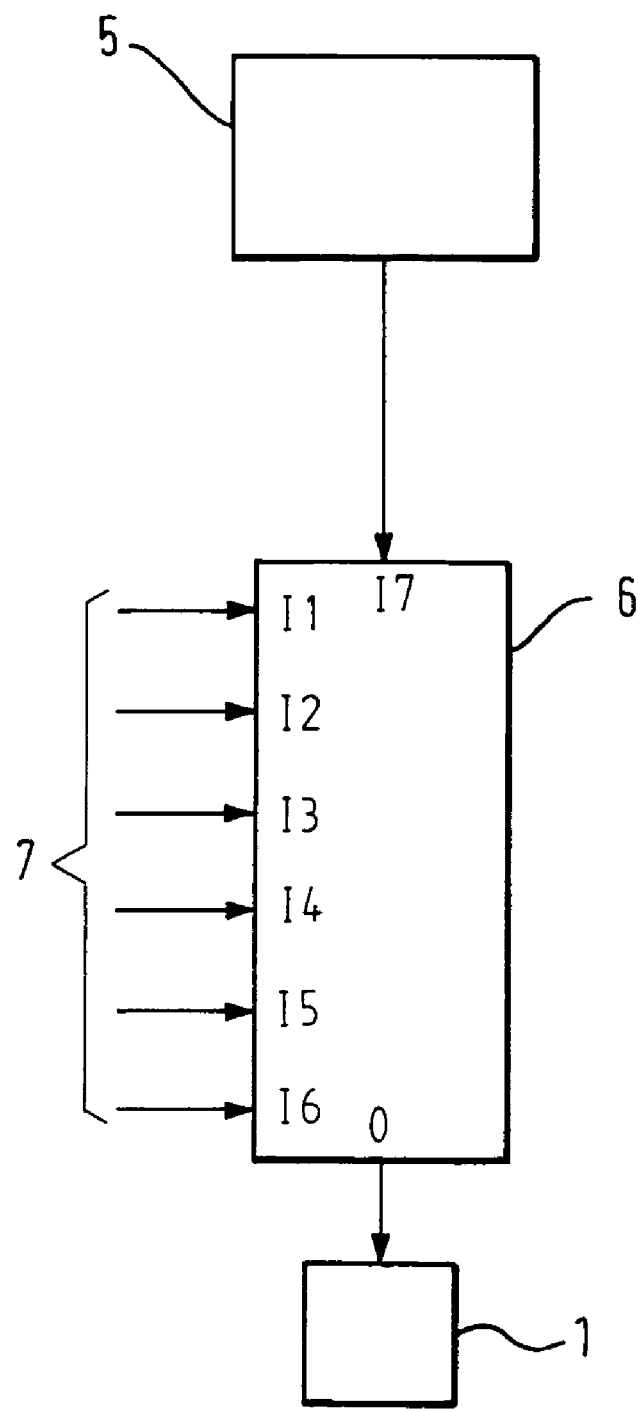
Figure 3:
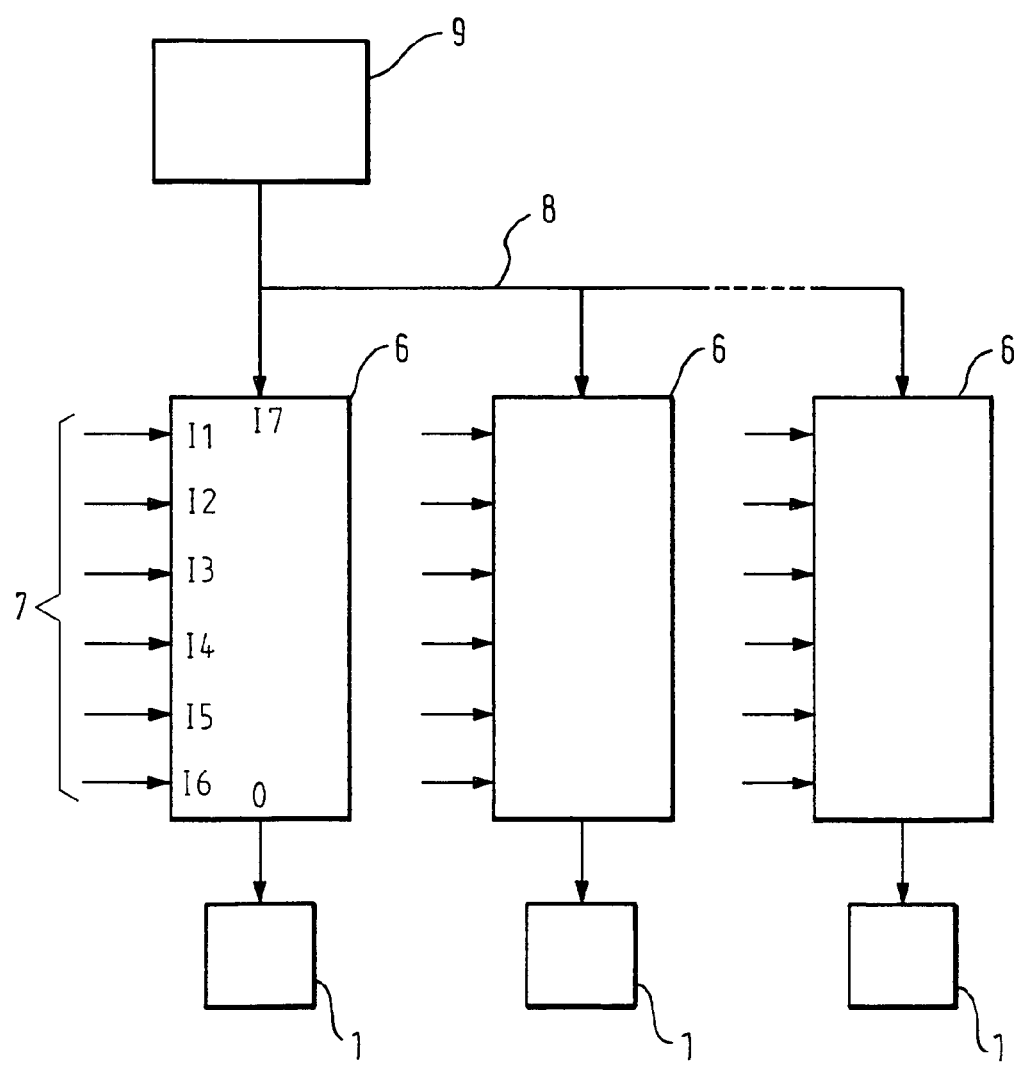
Figure 4:
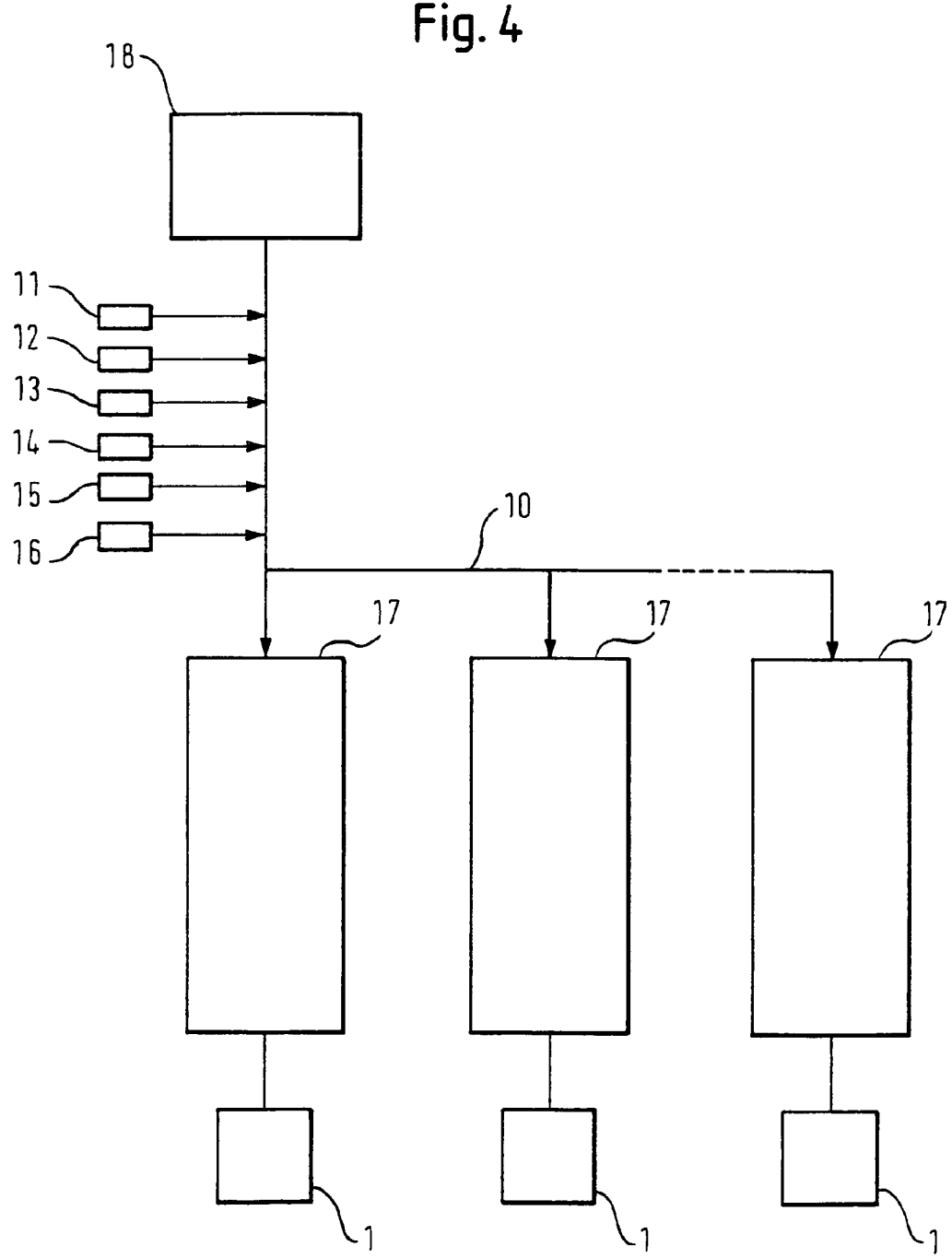

Additional features and advantages of the invention ensue from the following description of two different embodiments making reference to the drawings, which show the following:

FIG. 1 a schematic representation of a locking mechanism for a seatbelt retractor for which the method according to the invention is especially well-suited;

FIG. 2 a block diagram showing the actuation of the locking mechanism of a belt retractor;

FIG. 3 a block diagram of an embodiment with several control units and with the sensor signals for several belt retractors;

FIG. 4 a block diagram of another embodiment; and

Figure 5:
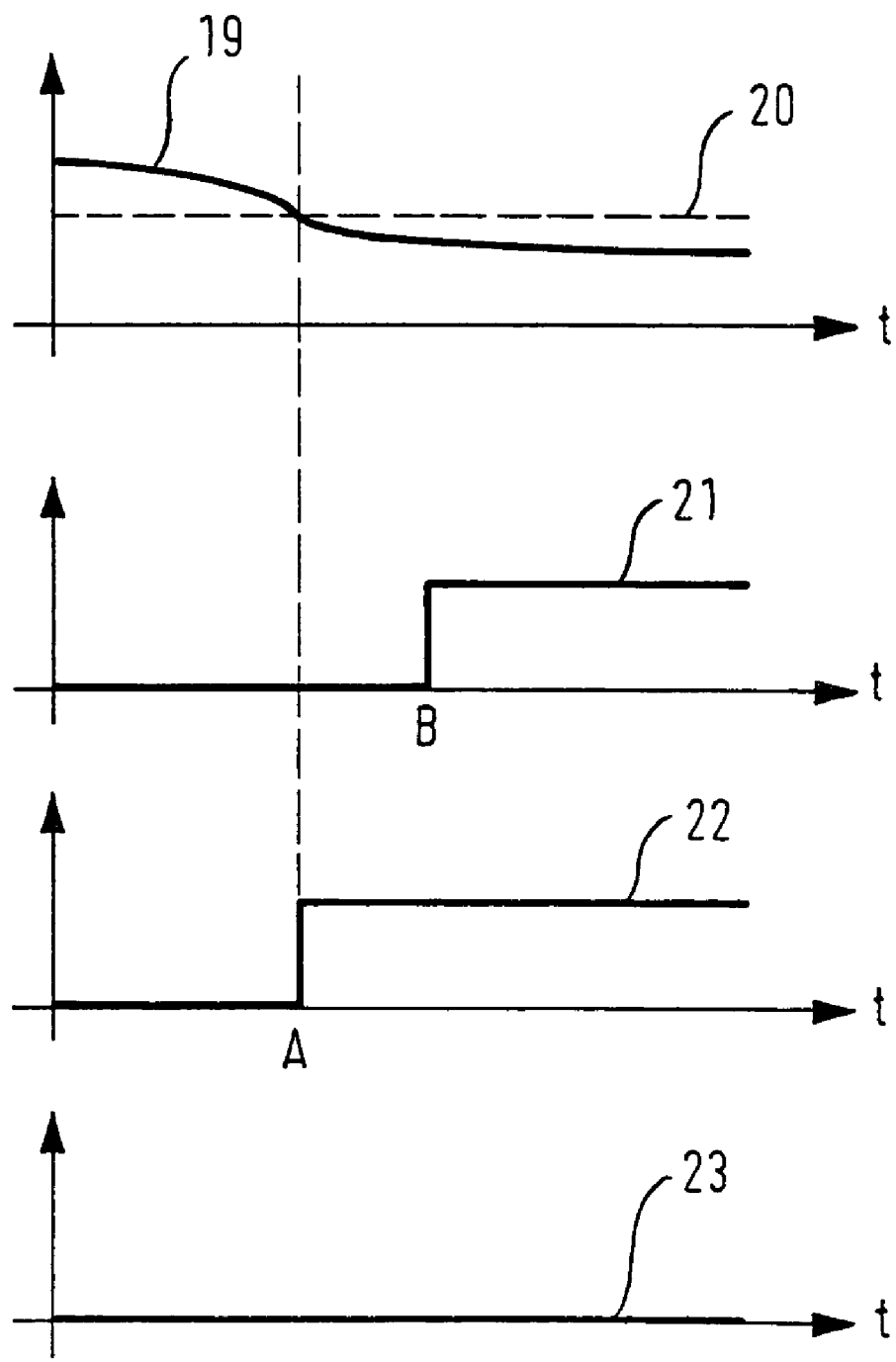

FIG. 5 time diagrams of sensor, triggering and actuation signals.

FIG. 1 shows a locking mechanism for a belt retractor with a switch 1, an electromagnet 2, a control disk 3 with external teeth and a locking pawl 4. The current interruption effectuated by opening the switch interrupts the excitation of the electromagnet 2, and the force exerted by the spring presses the locking pawl 4 against the external teeth of the control disk 3.

FIG. 2 shows a structure that is suitable for carrying out the method according to the invention, having a mechanical sensor 5, a control unit 6 and the switch 1. An actuation signal needed to open the switch 1 is emitted at the output O of the control unit 6. The control unit 6, which contains a microcontroller, receives at its input I7 the electric signal of the mechanical sensor 5, for example, a ball sensor, of the type already used in conventional systems for triggering the locking of a seatbelt. The output signals 7 of other sensors distributed in the vehicle are applied to the inputs I1 to I6.

The signal of an impact sensor is applied to input I1.

A signal from a seatbelt buckle switch is applied to input I2.

A signal from a rollover sensor is applied to input I3.

The signal of an ABS sensor is applied to the input I4.

The signal of a slip sensor can be applied to the input I5.

The signal of a vehicle-sensitive sensor is applied to the input I6.

Some of the listed sensor signals 7 can be replaced by other sensor signals that are available in the vehicle or else more/fewer input signals can be provided at more/fewer inputs.

These input signals are processed by two different algorithms in the control unit 6. A triggering algorithm ascertains whether the triggering criterion for locking the seatbelt is fulfilled. The triggering criterion is laid down by statutory regulations and/or specifications. An actuation signal is generated when a predetermined angle of inclination or a predetermined acceleration value is exceeded. A suppression algorithm determines on the basis of the measured signals whether one of the following states is present: the seatbelt is not in use, which is recognized, for example, on the basis of the signal of the seatbelt buckle switch, the vehicle is standing still, the vehicle speed is not above a certain limit value, or only the vehicle acceleration measured in the vertical direction exceeds a certain triggering limit value. If one of these states is recognized, then the actuation signal generated by the triggering algorithm is suppressed and does not reach the output O of the control unit.

The passenger seatbelt lock should not be triggered if the passenger seat is not occupied. The suppression algorithm suppresses the actuation signal.

When the vehicle is parked on a sloping street, then the triggering algorithm generates an actuation signal. On the basis of the measured signal of the vehicle-sensitive sensor at input I6, which indicates that the vehicle is standing still, the suppression algorithm prevents the emission of the actuation signal to the output O. Thus, it is ensured that the seatbelt can be fastened.

In case of a very slow vehicle speed and sudden braking of the kind that occurs in traffic jam situations, the triggering algorithm can likewise generate an actuation signal that would make annoying noises if the locking mechanism were to respond. Here, too, by evaluating the measured signals, the suppression algorithm recognizes that the speed lies below a certain defined minimum value and it suppresses the emission of the actuation signal.

A ball sensor as the mechanical sensor 5 does not distinguish between vertical and horizontal acceleration, so that an actuation signal is generated when the car drives over bumpy roads. On the basis of the signals of the vehicle-sensitive sensor, of the ABS sensor and/or of the impact sensor, the suppression algorithm can recognize when there is no horizontal acceleration and can appropriately block the actuation signal.

FIG. 3 shows an embodiment with a plurality of control units 6 for switches 1 with a bus 8 and with a central sensor unit 9. The measured signals of the central sensor unit 9 are distributed via the bus 8 to several seatbelt retractors located in the vehicle. In the central sensor unit 9, the acceleration values of the vehicle are determined along three orthogonal axes. The control units 6 have already been described in conjunction with FIG. 2. An actuation signal emitted on the basis of the evaluation of the measured signals at the appertaining output O opens the appropriate switch 1 and triggers the locking mechanism, as already described.

In the embodiment of FIG. 4, there are sensors 11 to 16 distributed throughout the vehicle, a central inertia sensor 18, control units 17 with switches 1 and a bus 10. The central inertia sensor 18 generates a triggering signal when a predefined acceleration value or angle of inclination of the vehicle is exceeded. This triggering signal is conveyed via the bus 10 to one or optionally more control units 17 equipped with microcontrollers. Moreover, the measured signals 11 to 16 are fed into this bus. The sensors are sensors that are distributed throughout the vehicle such as, for example, an impact sensor, a seatbelt buckle sensor, a rollover sensor, an ABS sensor, a slip sensor or a vehicle-sensitive sensor. It is possible to replace some of the mentioned sensors with others or to feed more/fewer measured signals into the bus. The triggering signal and the measured signals are combined in the control unit 17, so that the actuation signal is suppressed when the seatbelt is not in use. By the same token, no actuation signal is emitted when the vehicle is at a standstill. An activation of the locking mechanism is likewise not meaningful when the vehicle speed does not exceed a certain limit value or when only the vehicle acceleration measured in the vertical direction, for example, caused by potholes, exceeds a certain triggering limit value. In these cases as well, the combination of the triggering signal and the various measured signals cause a suppression of the actuation signal. The explanations pertaining to FIG. 2 apply here correspondingly.

The acceleration sensors 5, 9, 18 needed in the embodiments described above are here replaced by a central, capacitive acceleration sensor. This sensor detects the dynamic as well as the static acceleration of the vehicle in at least two directions that are at a right angle with respect to each other and then emits a pulse-duration modulated signal for each axis. In the stand-by state, the duty cycle is 1:1. An angular deviation of the sensor from the sensitive direction generates a signal whose duty cycle can be changed. The partial cycle periods are divided into equidistant sections with a time-related association and then the microcontroller uses a counting device to evaluate the duty cycle. This sensor allows the determination of the angle of inclination as well as the acceleration. An example of such a sensor is the ADXL 202 made by Analog Devices, Inc. The processing in the microcontroller is done with a static algorithm in order to evaluate the angle of inclination and with a dynamic algorithm in order to evaluate the acceleration values. By using different algorithm for the processing, the angle of inclination and acceleration can be weighted differently and in this manner, the triggering criteria for the angle of inclination and for the acceleration can be defined within narrow limits in a vehicle-dependent fashion.

FIG. 5 shows by way of example the sequence of the method according to the invention on the basis of four time diagrams. Curve 19 represents a sensor signal that provides information about the current speed, the broken line 20 shows a preselected speed threshold. Curve 21 shows the development over time of the triggering signal, curve 22 shows the output of the suppression algorithm, curve 23 shows the actuation signal provided at the output of the control unit.

In curve 19 the vehicle is slowly reducing its speed. At the point in time A, the speed falls below the pre-specified speed value that is indicated by the broken line 20, in this manner, the suppression algorithm generates a suppression signal 22. At the point in time B, the vehicle brakes abruptly, which causes the mechanical sensor to respond, that is to say, the triggering criterion is fulfilled and an actuation signal 21 is generated. Owing to the suppression signal that has existed since the point in time A, no control signal 23 is provided at the output O of the control unit. The locking mechanism does not respond since this is not necessary in view of the low speed of the vehicle.

What is claimed is:

1. A method for vehicle-sensitive actuation of a locking mechanism for a seatbelt retractor in a vehicle by means of an actuation signal that is generated by a control unit equipped with a microcontroller to which unit measured signals are transmitted from a plurality of sensors that detect the condition of the vehicle, wherein a triggering criterion for the locking mechanism is specified by evaluating the measured signals and the actuation signal is suppressed if the triggering criterion is fulfilled and the measured signals indicate one of the following conditions:
   the seatbelt is not in use;
   the vehicle is not moving;
   the vehicle speed is not above a predetermined limit value,
   only the vehicle acceleration measured in the vertical direction exceeds a predetermined triggering limit value.

2. The method according to claim 1, in which the vehicle acceleration values are detected along three orthogonal axes by means of a central sensor unit and the corresponding measured values are distributed via a bus to a plurality of seatbelt retractors.

3. The method for vehicle-sensitive actuation of a locking mechanism for a seatbelt retractor in a vehicle, using an actuation signal that is generated by a control unit equipped with a microcontroller to which unit a triggering signal is transmitted from a central inertia sensor via a bus if a predefined acceleration value or angle of inclination of the vehicle is exceeded, wherein the control unit also receives measured signals from other sensors via the bus and combines the triggering signal with the measured signals in such a way that the actuation signal is suppressed if the measured signals indicate one of the following conditions:
   the seatbelt is not in use;
   the vehicle is not moving;
   the vehicle speed is not above a predetermined limit value,
   only the vehicle acceleration measured in the vertical direction exceeds a predetermined triggering limit value.

4. The method according to claim 1, in which a capacitive acceleration sensor is used that detects dynamic as well as static acceleration of the vehicle in at least two directions that are at a right angle with respect to each other and then emits a pulse-width modulated signal for each axis.

5. The method according to claim 1, in which the locking mechanism of the seatbelt retractor has a restrictedly rotatable control disk with external teeth that is mounted on the retractor shaft, wherein said locking mechanism has a triggering pawl that interacts with the control disk, that is either spring-loaded in engagement with the external teeth of the control disk or that is held by an electromagnet so as to be disengaged from the external teeth of the control disk during the excitation of said electromagnet.

* * * * *